United States Patent [19]

Highfill et al.

[11] Patent Number: 5,294,424
[45] Date of Patent: Mar. 15, 1994

[54] PROCESS FOR PREPARING HIGH ABSORPTIVITY GRANULAR SODIUM PHOSPHATES

[75] Inventors: Louis A. Highfill, Union, Mo.; Kent P. Lannert, Freeburg, Ill.

[73] Assignee: Monsanto Company, St. Louis, Mo.

[21] Appl. No.: 540,993

[22] Filed: Jun. 20, 1990

[51] Int. Cl.$^5$ .................. C01B 25/30; C01B 25/40
[52] U.S. Cl. .................. 423/305; 423/312; 423/315
[58] Field of Search .................. 423/315, 305, 312

[56] References Cited

U.S. PATENT DOCUMENTS

| | | | |
|---|---|---|---|
| 3,384,452 | 5/1968 | Heymer et al. | 423/315 |
| 3,506,586 | 4/1970 | Baskerville et al. | 423/315 |
| 3,932,590 | 1/1976 | Pals et al. | 423/315 |
| 4,134,963 | 1/1979 | Pals | 423/315 |
| 4,251,498 | 2/1981 | Hensler et al. | 423/315 |
| 4,255,274 | 3/1981 | Hensler et al. | 252/135 |
| 4,315,898 | 2/1982 | Lutz | 423/315 |
| 4,394,358 | 7/1983 | Maurer et al. | 423/305 |
| 4,734,214 | 3/1988 | Joubert | 252/135 |
| 4,770,865 | 9/1988 | Highfill | 423/315 |
| 4,790,983 | 12/1988 | Saran | 423/315 |
| 4,800,055 | 1/1989 | Klee et al. | 264/118 |

Primary Examiner—Wayne Langel
Attorney, Agent, or Firm—R. C. Loyer

[57] ABSTRACT

A process for preparing high absorptivity granular sodium phosphate mixtures made of sodium tripolyphosphate, pyrophosphates, metaphosphates and orthophosphates by hydrating and dehydrating a mixture comprising sodium tripolyphosphate in major proportion, and recovering the high absorptivity granular sodium phosphate mixture.

9 Claims, No Drawings

PROCESS FOR PREPARING HIGH ABSORPTIVITY GRANULAR SODIUM PHOSPHATES

FIELD OF THE INVENTION

The present invention relates to a method of preparing a mixture of sodium tripolyphosphate, pyrophosphates, metaphosphates and orthophosphates This mixture is hereinafter referred to as sodium phosphates (SP). More particularly, the present invention relates to a method of preparing a granular SP having a high absorptivity from a mixture comprising sodium tripolyphosphate in a major proportion, hereinafter referred to as STP, by hydrating the STP, dehydrating the STP and recovering the SP.

BACKGROUND OF THE INVENTION

In the formulation of modern detergent compositions, ganular STP has come into widespread use as a phosphate "builder" which increases the cleaning ability of these detergent compositions. In formulating free-flowing, homogeneous detergent compositions containing a granular STP product, the STP employed has been manufactured so that its various physical properties suit the ultimate use. Physical properties which are generally important include bulk density, frangibility and absorptivity. U.S. Pat. No. 4,255,274 discloses a method of preparing granular STP, wherein dense rotary-dried STP is moisturized by adding from about 10% to 30% by weight water, then calcining at a temperature in the range of about 300° to 600° C. U.S. Pat. No. 4,251,498 discloses a method of preparing granular STP products wherein screen undersize STP particles are compacted, milled and moisturized by adding from about 15% to 35% by weight water, and then calcined at from about 300° to 600° C. Both patents claim to produce a granular STP product that has low frangibility, high absorptivity and a bulk density in the range of about 0.65 to 0.87 g/cc. Both of these processes have the disadvantage of having an energy intensive calcination step.

U.S. Pat. No. 4,734,214 discloses a method of preparing powdered STP hexahydrate by spraying phase 1 STP and phase 2 STP separately with water, combining the two phases, suspending the mixture in water, and, finally, atomizing the suspension to produce the powder. The STP powder produced is said to have high absorptivity, low frangibility and good flow properties. This complicated process requires five steps to produce the desired STP product. Neither process yields a high absorptivity STP.

U.S. Pat. No. 4,800,055 discloses a process for making a granular STP wherein STP fines are hydrated and compacted to produce granular STP. Preferably, phase 1 STP fines are used. U.S. Pat. No. 4,394,358 discloses a process to make granular alkali metal diphosphates or triphosphates by hydrating the fines of the above phosphates, then granulating them in the presence of water and an ammonium polyphosphate.

U.S. Pat. No. 4,134,963 discloses a process to make low density granular STP by spraying STP fines with water in excess of that required for hydration to form an agglomerated product which is then calcined. U.S. Pat. No. 3,932,590 discloses a process for preparing medium density granular STP by spraying STP fines with a solution of sodium orthophosphate to prepare an agglomerated feed which is then calcined. These two processes also have the disadvantage of requiring calcination. None of the above patents disclose the present method of producing SP particles with high absorptivity.

SUMMARY OF THE INVENTION

The present invention is a method of preparing high absorptivity granular SP by hydrating STP, dehydrating the STP and recovering the SP.

DETAILED DESCRIPTION OF THE INVENTION

The starting material or "feed" material for the present invention is a standard STP builder-type material. The composition of the STP contains a major proportion of sodium tripolyphosphate. The composition is typically in the range of from about 70 to 100 weight % sodium tripolyphosphate, 0 to 20 weight % pyrophosphate, 0 to 10 weight % metaphosphate and 0 to 10 weight % orthophosphate.

The bulk density of the feed material can vary widely, and it has been found that light density (0.40 to 0.55 g/cc), medium density (0.56 to 0.84 g/cc) and high density (0.85 to 1.20 g/cc) feeds are all effective in the present invention. The bulk density of the SP produced increases with the bulk density of the feed material, e.g., high density STP produces a higher density SP than does low density STP feed.

The particle size distribution of the feed material should be in the range of about 0 to 85% by weight +20 mesh, 15 to 100% by weight −20+100 mesh and 0 to 20% by weight −100 mesh. A preferred particle size distribution of the feed material is 100% −20 +100 mesh because this provides a SP product that nearly matches the particle size distribution of the solid components of a dishwashing or laundry detergent.

The frangibility of the granules relates to the particle strength. The lower the frangibility, the stronger the particle. Particles of low frangibility are desired to prevent fracturing of particles during mixing, handling and transporting the detergent formulations. Values below 20% are considered good and below 10% are excellent. The SP granules produced using the present method typically have a frangibility below 20% when the feed material is low or medium density. When the feed material is high density, the frangibility of the SP produced is typically below 10%. The high density STP is a preferred feed, because it produces a higher density SP with lower frangibility.

The particle size of the SP produced is typically in the range of 0 to 40% by weight +20 mesh, 15 to 100% by weight −20+100 mesh and 1 to 20% by weight −100 mesh. The bulk density of the granules produced by the present method is typically in the range of about 0.4 to 0.8 g/cc, depending on the density of the starting material. This combination of particle size distribution and bulk density typically provides a granular SP with the desired free-flowing, essentially homogeneous composition.

Absorptivity relates to the ability of a particle to absorb various liquid components employed in the formulation of detergent compositions. High absorptivity values are a critical factor in formulating, for example, free-flowing detergent compositions which contain liquid surfactants, or dry mixed automatic dishwashing compostions. Absorptivity values above 10% are generally desired in formulating such compositions. Values above 15% are considered very good and above 20% considered excellent. The SP of the present invention typically has absorptivity values above 20%. Typically, lower bulk density SP formed has higher absorptivity. Maximizing the property of absorptivity by lowering the bulk density must be balanced against the higher frangibility incurred with SP having lower bulk density.

For the purposes of this invention, an amount of water added to the feed STP is enough to hydrate the STP feed, but not enough to cause agglomeration of the particles. The theoretical amount of water necessary to completely hydrate STP is 22.7% by weight of the total weight of water and STP. Because of the heat of hydration and the water loss generated thereby, about a 33 weight % excess of the theoretical water of hydration is added to compensate for the water lost. If much less than about 20 to 22 weight % of water is present in the STP before dehydration, the absorptivity of the resulting SP is reduced. If more than about 33% excess water of hydration is added, the STP particles agglomerate resulting in a SP of undesirable particle size distribution. A preferred amount of water of hydration is in the range of about 15 to about 25 weight %. A more preferred amount of water of hydration is in the range of about 20 to 22 weight %.

Water may be mixed with the STP in any manner that provides intimate mixing of the water with the solid material. Suitable methods of mixing include manual mixing or mechanical rotary mixing. The equipment used to effect mixing includes a Hobart mixer, a rotating horizontal drum hydrator, ribbon blender, mixing screw or a vertical agglomerator. Spraying is the preferred method of water addition and may be done by any of the conventional spraying means, which include air atomized or hydraulic spray nozzles.

The term "water" is to be understood to mean pure water, or water containing minor amounts, that is less than 15% by weight of STP or other such polyphosphates.

The rate of hydration, i.e., the rate of addition of water to the STP can vary. Typically, at faster addition rates of water, there is a greater agglomeration of fines resulting in a higher percentage of +20 mesh screen sized particles. Overall, however, the rate of addition of water for hydration has little impact on the performance properties of the SP formed.

The hydrated STP can be dehydrated in any convenient manner. Air drying is sufficient. Drying may be performed by circulating air, heated air or other means. The temperature of dehydration can vary in the range of from about 100° C. to about 300° C. Below 100° C., the heat is insufficient to completely dehydrate the STP. A preferred dehydration temperature is about 130° C.

Analysis of the phosphates of the STP feed and the SP produced by the present method indicates a chemical change in the makeup of the phosphates upon dehydration. The STP feed is typically comprises greater than 80% by weight sodium tripolyphoshate, the SP product is typically less than 80% tripolyphosphate, and is often less than 50 weight % tripolyphosphate. The decrease in STP is typically proportionate to an increase in sodium pyrophosphate. The SP is typically a mixture of phosphates, the majority of the phosphates being a combination of STP and pyrophosphates. SP produced in accordance with this invention is a mixture in the range of about 10 to 90 weight % STP, 5 to 80 weight % pyrophosphate, 0 to 15 weight % orthophosphate and 0 to 10 weight % trimetaphosphate. When the dehydration temperature is above about 300° C., the chemical conversion that occurs in the dehydration step is reversed, and sodium pyrophosphate is converted to STP.

Sequestration of calcium is the ability of the detergent builder to chelate calcium, thereby keeping it in solution. It is desirable to maximize the ability of a builder to sequester calcium. The process of the present invention improves this ability of the SP over that of the STP feed material. The amount of sequestration appears to increase with the amount of sodium pyrophosphate present. As noted above, the formation of pyrophosphate increases with the level of hydration. If the hydrated STP is overheated in the dehydration step, i.e., heated above about 300° C., the ability to sequester calcium is lower than STP dehydrated at cooler temperatures.

The dehydrated SP granules are recovered, generally by screening the product to isolate the desired fraction. For commercial purposes, the granular product fraction isolated is generally encompassed by the fraction −−16 to +100 mesh. Oversized particles may be milled and then rescreened to recover the desired fraction.

The following examples are for illustrative purposes only and are not intended to limit the scope of this invention in any manner.

EXAMPLES

Frangibilty was determined by screening the sample to remove -100 mesh particles and placing 100 g of the dried, screened product on a 100 mesh screen. Three rubber balls, about 2 inches (5.08 cm) in diameter were placed on the screen. The screen was placed on a RoTap sieve shaker (manufactured by W. S. Tyler, Inc.) and shaken for 15 min. The amount of material which passed through the 100 mesh screen was weighed, and the % by weight of the sample calculated.

The bulk density was determined by the Solvay Process Method 302A described in the Solvay Technical and Engineering Service Bulletin No. 9, issued in 1944.

The absorptivity values on the STP and SP samples are determined by the following method, referred to in the art as the "wipe out" method:

100 g of the STP or SP material is charged to a 600 ml beaker equipped with a stirrer which provides just enough stirring to keep the material agitated. A surfactant, Plurafac D-25 nonionic surfactant, is slowly added with a burette until streaks appear on the beaker wall. This effect is known as "wipe out" and is caused by surfactant leaching from the STP or SP. A slight haze is visible on the inner wall of the beaker before the actual end point. The % absorptivity is determined as a weight % basis, i.e., the weight of the absorbed surfactant divided by the total weight of the STP or SP and the surfactant, multiplied by 100.

The sequestration of calcium was determined by potentiometric titration using a Metrohm E 436 Automatic Potentiograph and an E 436 D Automatic Feed Titrator, equipped with a calcium selective ion electode.

The phosphate composition was determined by $P^{31}$NMR.

The following controls and examples were prepared by hydrating the STP samples to the indicated level, dehydrating the samples under the indicated conditions, and evaluating the resulting SP.

TABLE 1

The bulk density of the feed material was varied in Examples 1 through 5, shown in Table 1. The samples were treated as follows: 1000 g of the indicated STP sample was mixed with from 270 ml to 325 ml of deionized water, i.e., sufficient water to provide 20 to 22% moisture, in a Hobart mixer. The water was added by pouring or spraying over the STP during a 15 minute period. Mixing was continued for about 30 min. The mixture was placed in an oven at 132° C. for about 12 h.

Comparing Control C-1 which was neither hydrated or heated to Examples 1 through 5 indicates that the treated Examples have a higher absorptivity, e.g., 16.46 for C-1 versus 33.05 for Example 1. Increasing the bulk density of the feed material from about 0.50 to 1.1 g/cc had the effect of increasing the corresponding bulk density of the SP and decreasing the frangibility. The treated samples have a higher frangibility value and a lower bulk density than that of the untreated samples.

TABLE 1

| Varying Bulk Density of STP Feed | | | | | |
|---|---|---|---|---|---|
| Sample | Treatment | (%) Water of Hydration | Absorptivity (%) | Frangibility (%) | Bulk Density* (g/cc) |
| C-1 | Untreated | 0 | 16.46 | 3.13 | 0.50 |
| 1 | Treated | 20–22 | 33.05 | 14.19 | 0.47 (0.50) |
| 2 | Treated | 20–22 | 38.70 | 15.91 | 0.43 (0.50) |
| 3 | Treated | 20–22 | 36.50 | 11.11 | 0.55 (0.83) |
| 4 | Treated | 21–22 | 29.10 | — | 0.70 (1.07) |
| 5 | Treated | 20–22 | 46.90 | 12.40 | 0.43 (0.55) |

TABLE 2

Samples 6-10 were treated as described for the samples in Table 1, except that the water was added as quickly as possible. The dehydration temperature was varied in samples 6, 7, 9 and 10 from 100° C. to 130° C. Sample 8 was subjected to calcining at a temperature of 450° C. which not only removed water but also reconverted the other phosphates to STP.

TABLE 2

| Varying the Hydration/Dehydration Conditions | | | | | | | | |
|---|---|---|---|---|---|---|---|---|
| Sample | Dehydration Temperature | Sequestration g Ca$^{++}$/100 g | Absorptivity (%) | Frangibility (%) | Bulk Density | Phosphate Assay | | |
| | | | | | | Tripoly- | Pyro- | Trimeta- | Ortho- |
| C-2 | Untreated | 15.9 | 6.30 | 0.81 | 0.99 | 94.7 | 4.7 | 0.5 | 0.2 |
| 6 | 100 | 23.5 | 27.84 | 6.79 | 0.76 | 35.8 | 54.2 | 0.3 | 9.7 |
| 7 | 130 | 24.3 | 25.80 | 6.04 | 0.73 | 30.1 | 62.8 | 0.3 | 6.8 |
| 8 | 450 | 15.2 | 32.60 | 8.87 | 0.82 | 95.4 | 4.6 | 0 | 0 |
| C-3 | Untreated | 17.1 | 7.80 | 0.60 | 1.03 | 92.8 | 6.2 | 0.4 | 0.6 |
| 9 | 100 | 21.9 | 25.60 | 4.91 | 0.75 | 59.4 | 37.5 | 0.2 | 2.9 |
| 10 | 130 | 22.7 | 33.84 | 5.17 | 0.71 | 36.3 | 53.0 | 0.2 | 10.5 |

Increasing the dehydration temperatures from 100° C. to 130° C. increased the sequestration values and increased the conversion of tripolyphosphate to pyrophosphate. Further increasing the dehydration temperature to 450° C. caused the increase of STP and decrease of pyrophosphate.

TABLE 3

The amount of water of hydration was varied from 0 to 20.87 % in Controls C-4, and Examples 11, 12 and 13, shown in Table 3. The samples were treated as described for the samples in Table 1. The data in Table 3 indicates that the higher the level of hydration, the greater the conversion of tripolyphosphate to pyrophosphate.

TABLE 3

| Varying Amount of Hydration Water | | | | | |
|---|---|---|---|---|---|
| Sample | Water (%) | Phosphate Assay (%) | | | |
| | | Tripoly- | Trimeta- | Pyro- | Ortho- |
| C-4 | 0 | 94.7 | 0.5 | 4.7 | 0.2 |
| 11 | 10.02 | 86.5 | 0.6 | 11.8 | 1.1 |
| 12 | 15.18 | 84.6 | 0.4 | 13.6 | 1.4 |
| 13 | 20.87 | 76.7 | 0.3 | 20.3 | 2.7 |

We claim:

1. A method of preparing high absorptivity granular sodium phosphates which comprises fully hydrating a mixture of phosphates comprising greater than 80% by weight granular sodium tripolyphosphate, dehydrating the hydrated mixture at a temperature in the range of from about 100° C. to about 300° C. and recovering the sodium phosphates comprising less than 80% by weight sodium tripolyphosphate.

2. The method of claim 1 wherein water for hydration is added to the STP in the amount of from about 15% to about 25% by weight of said STP.

3. The method of claim 1 wherein the STP feed material has a particle size distribution in the range of about 0 to 85% +20 mesh, 15 to 100% −20+100 mesh and 0 to 20% −100 mesh.

4. The method of claim 3 wherein the STP is hydrated by mixing in water with a device selected from the group consisting of a mechanical agitating mixer, a rotating horizontal drum hydrator, ribbon blender, fluidized bed, mixing screw and vertical agglomerator.

5. The method of claim 3 wherein the STP is hydrated by spraying with water.

6. The method of claim 5 wherein the hydrated STP is dehydrated by heating with circulating air.

7. The method of claim 1 wherein the water is removed at a temperature in the range of from about 100° C. to about 130° C.

8. The method of claim 1 wherein the STP contains from about 70% to about 100% STP.

9. A method of preparing high absorptivity granular sodium phosphates by hydrating a mixture comprising greater than 80% by weight granular sodium tripolyphosphate by adding water in an amount in the range of from about 15% to about 25%, by weight, by mixing said mixture with water in a device selected from the group consisting of a mechanical agitating mixer, a rotating horizontal drum hydrator, ribbon blender, mixing screw and vertical agglomerator, hydrating the hydrated mixture at a temperature in the range of about 100° C. to 130° C. and recovering high absorptive granular sodium phosphates.

* * * * *